Dec. 12, 1967  J. R. SNELL  3,357,812
METHOD AND APPARATUS FOR THE AEROBIC COMPOSTING
OF ORGANIC WASTE MATERIAL
Filed Oct. 20, 1964  3 Sheets-Sheet 2
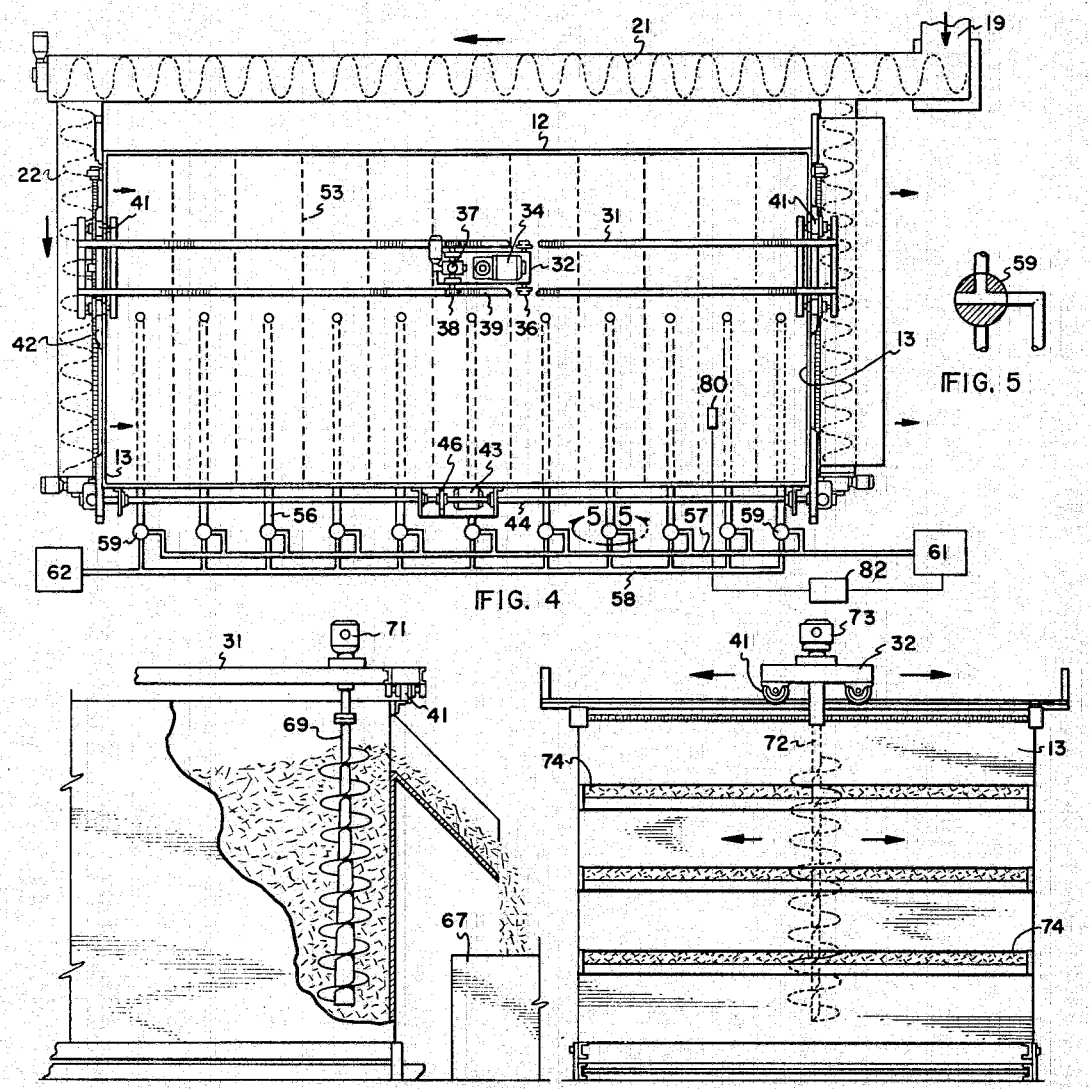
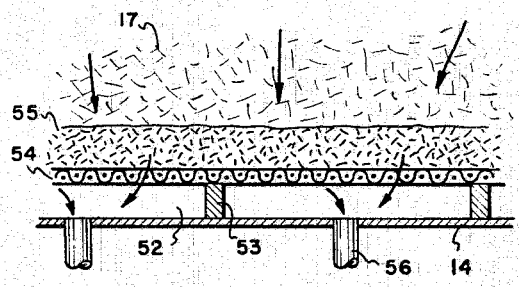
INVENTOR.
JOHN R. SNELL
BY Robert W. Habel
ATTORNEY

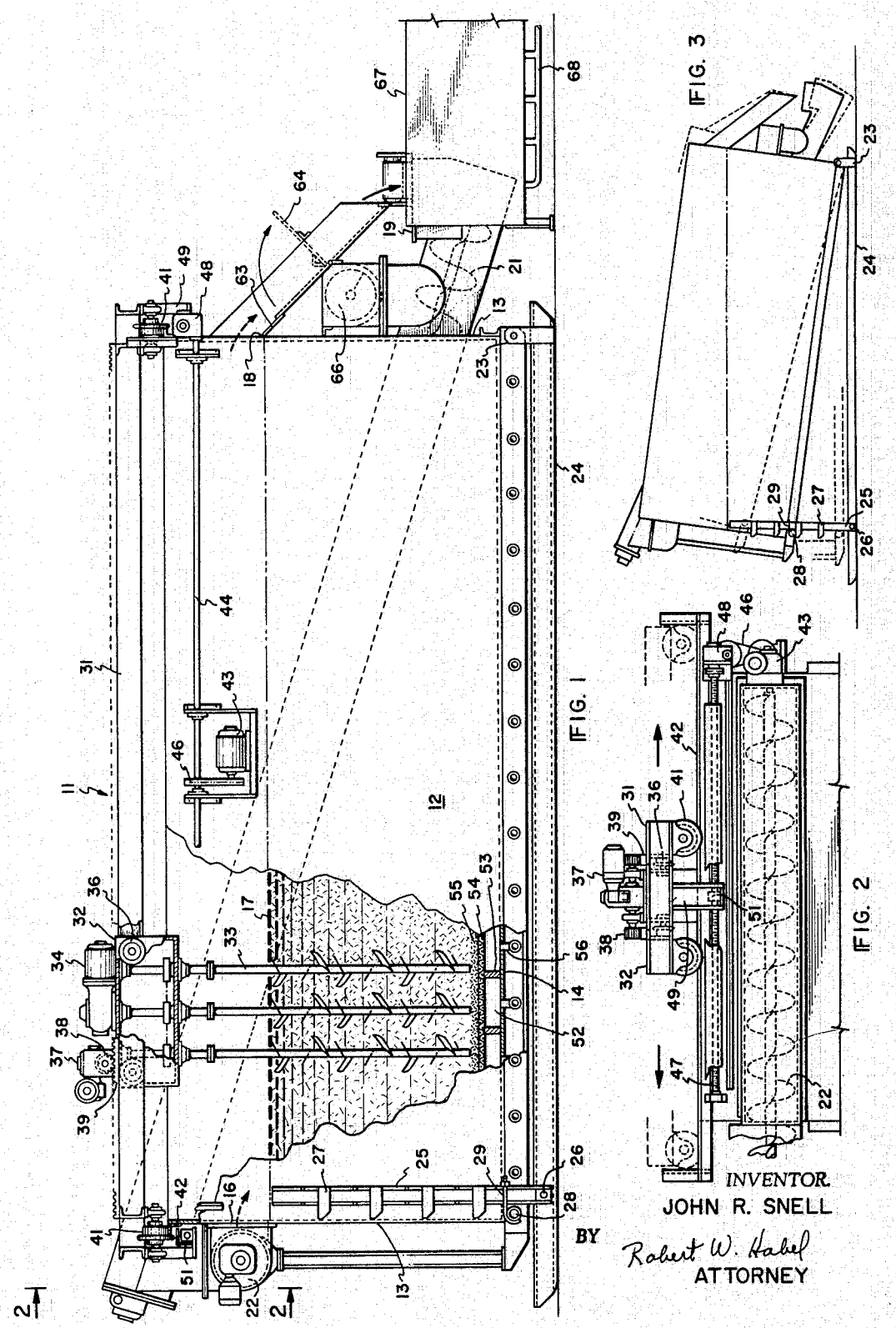

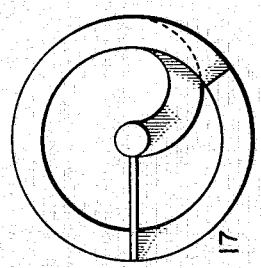
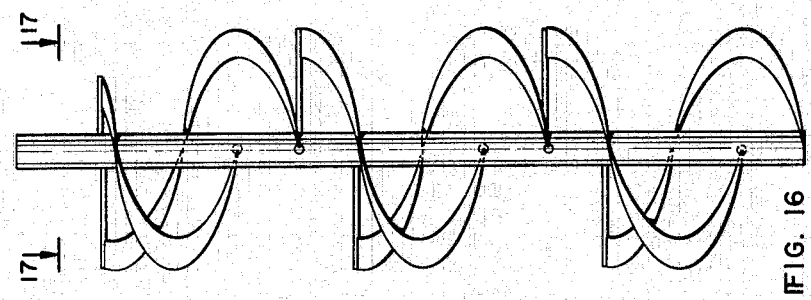
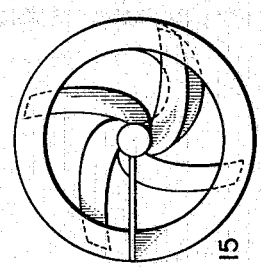
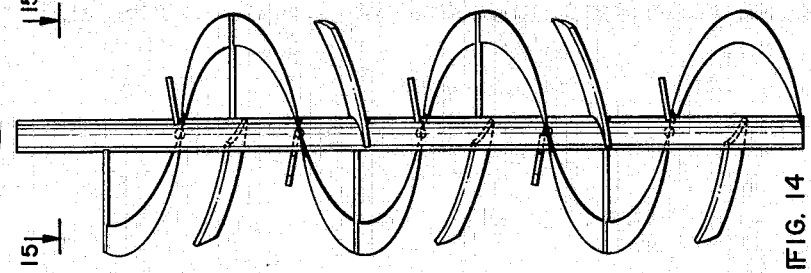
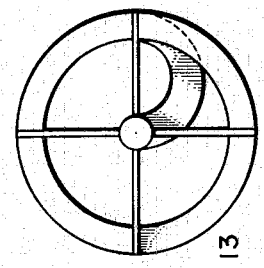
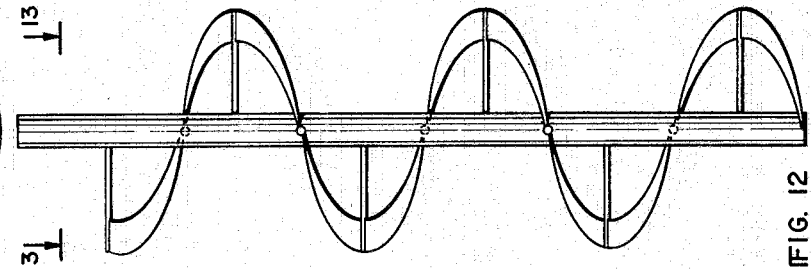
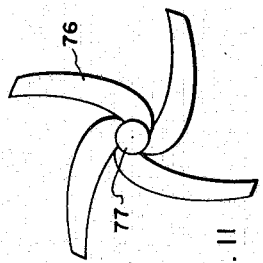
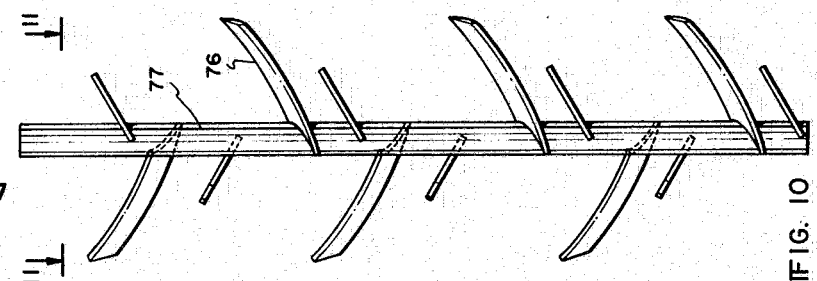

United States Patent Office 3,357,812
Patented Dec. 12, 1967

3,357,812
METHOD AND APPARATUS FOR THE AEROBIC COMPOSTING OF ORGANIC WASTE MATERIAL
John R. Snell, 6103 Lake Drive,
Haslett, Mich. 48840
Filed Oct. 20, 1964, Ser. No. 405,032
10 Claims. (Cl. 71—9)

ABSTRACT OF THE DISCLOSURE

Apparatus and methods are disclosed for composting organic waste materials to yield a product suitable for use as a fertilizer or soil conditioner wherein oxygen containing gas is uniformly directed through the waste materials while agitating certain zones of the material without lifting the material.

This invention relates generally to the composting or conversion by decomposition of organic waste material such as garbage, sewage sludges, industrial or agricultural wastes and other refuse to yield a clean, easily-handled and useful compost product. More particularly, the invention is concerned with improved ways and means for rapidly and effectively composting organic waste materials to yield a product suitable for use as a fertilizer or soil conditioner.

The term composting as used herein means the controlled decomposition or breakdown of plant and animal matter by thermophilic micro-organisms until it is stablized in the form of a relatively dry finely-divided material, usually referred to as compost.

The primary object of this invention is to provide an improved method and apparatus for continuously composting organic refuse.

Another important object is to provide a method and apparatus enabling rapid and efficient composting in minimum space.

A related object is to provide an improved method and apparatus enabling aeration of an entire mass of organic material undergoing composting whereby such treatment mass may be uniformly supplied with the oxygen required for support of the micro-organisms while undesirable localized cooling is avoided.

Another object is to provide improved means for feeding raw wastes to the digester and for discharging finished compost therefrom.

A further object is to provide improved means for systematically and uniformly agitating the entire treatment mass during composting without excess heat loss and with only a minimum expenditure of energy.

Still further objects include the provision of ways and means for reducing the moisture content of the finished compost; and for insuring maximum nitrogen content in the finished compost by minimizing formation and loss of ammonia.

The foregoing and probably other objects are carried out in composting apparatus constructed in accordance with the invention that is low in initial cost, simple and economical of operation yet adapted to handle a wide variety of organic materials.

In brief, the method invention is drawn to preparing and treating organic waste materials under conditions conducive to controlled rapid decomposition and comprises the steps of grinding the raw material into small particles, conditioning the ground raw material by adjusting its moisture content to the optimum level for aerobic decomposition by thermophilic micro-organisms, establishing and maintaining in a composting zone an ever-changing treatment mass in the form of a laterally confined bed by introducing controlled quantities of the resulting conditioned material into such zone while discharging therefrom a proportionate quantity of compost, and effecting composting of feed material in the treatment mass in such zone by maintaining an environment favorable to odor-free decomposition of the feed material by thermophilic micro-organisms by continuously agitating successive portions of the treatment mass therein without substantial vertical displacement of any portion thereof while aerating the mass with air or other oxygen-bearing gas and maintaining its temperature at a level conducive to the growth and activity of thermophilic micro-organisms.

In accordance with the invention, loss of nitrogen as ammonia is minimized by maintaining finished compost under aerobic conditions until its eventual use. Advantageously, this step may be utilized to further reduce the moisture content.

The apparatus invention comprises a generally rectangular open-top tank having a bottom and upstanding side walls, means for introducing organic waste material at one end of the tank and for discharging finished compost from the opposite end thereof, means communicating with the interior of the tank for selectively effecting air circulation upwardly and downwardly, and means for agitating and loosening successive increments of the mass during treatment without substantial vertical displacement of material from any portion of the mass.

Special features of the apparatus invention include means for simultaneously or separately discharging finished compost from several elevations at the tank discharge end, means for recycling portions of finished compost to the raw feed inlet, and means for adjusting the moisture content of the raw material upon entry into the tank and of the compost prior to and after discharge from the tank.

In order to facilitate material flow through the tank, means are provided for adjustably sloping the tank bottom. In accordance with a preferred form of the invention, this is advantageously accomplished by raising the feed end of the tank; and the degree of slope is adjusted to provide the desired material flow-through rate to thereby control detention time in relation to other factors, such as feed characteristics and agitation rate.

In order that the invention may be more fully understood and carried into effect reference is made to the accompanying drawings taken in conjunction with the specification which are offered by way of example only and not in limitation of the invention, the scope of which is defined by the appended claims and not by any description preceding them.

In the drawings:

FIG. 1 is a side elevational view of apparatus embodying a preferred form of the invention, a part of the side wall being cut away and some hidden elements shown in dotted lines for purposes of clarity.

FIG. 2 is a partial end view of the apparatus of FIG. 1, taken as looking in the direction of arrows 2—2 of FIG. 1 with some elements being shown in phantom lines and hidden elements in dotted lines for purposes of clarity.

FIG. 3 is a simplified side view of the apparatus of FIG. 1 illustrating the various inclined positions in which the tank may be placed.

FIG. 4 is a top plan view of the apparatus of FIG. 1 with some elements being shown in phantom lines and hidden elements in dotted lines for purposes of clarity.

FIG. 5 is an enlarged simplified top-sectional view of one of the three-way valves employed in the apparatus shown in FIG. 4.

FIG. 6 is an enlarged side sectional view of a portion of the tank bottom structure.

FIG. 7 is a simple line sketch taken as viewing the tank from above and tracing, by solid and dotted lines, the path followed by the agitators during a complete cycle.

FIG. 8 is a cut-away side view of apparatus illustrating details of an embodiment of the discharge mechanism different from that shown in FIG. 1.

FIG. 9 is an end elevational view illustrating another form of discharge mechanism useful under special conditions, hidden elements being shown in dotted lines for clarity.

FIGS. 10 and 11 are side and end elevational views respectively of one form of agitator adapted for use in the apparatus of the invention.

FIGS. 12–17 are views similar to FIGS. 10 and 11 showing three other forms of agitators useful in the invention.

Referring first to FIGS. 1–6, there is shown a composting tank generally designated 11 having sidewalls 12, end walls 13 and a bottom 14. Organic refuse, suitably ground to a relatively small particle size in a grinder (not shown) and having an optimum moisture content for digestion (preferably 50 to 60%) is fed to the tank through a transverse feed port 16 in the end wall 13, to thus establish a treatment mass of composting material 17, the upper level of which is controlled by a suitable overflow discharge weir 18 at the opposite end wall. Preferably the raw feed material is ground to a fine state in order to expose as much surface area to decomposition as possible thus increasing the composting rate.

In the illustrated embodiment, ground organic refuse is received in a feed hopper 19, mounted on and communicating with the lower end of an inclined screw conveyor 21. The conveyor transfers the material to a screw feed assembly 22 of particular construction mounted adjacent the upper portion of end wall 13 for introduction into the tank. In this connection, it will be observed that feed screw 22 is enclosed longitudinally on three sides, while the fourth or open side is in communication with the feed port 16 which extends across the entire width of the tank. This is important because it insures that raw feed will be supplied uniformly across the tank width to in turn insure optimum availability of raw feed to the micro-organisms in the treatment mass.

It should be noted that the treatment mass behaves in much the same manner as a viscous liquid and in effect "flows" toward the discharge end of the tank and over the weir 18 under the influence of forces imposed by the weight of incoming feed. To control this flow the tank is mounted to rotate about a pivotal connection 23 between the tank discharge end and support skids 24 running the entire length of the tank. Stanchions 25 are provided on opposite sides of the feed end of the tank and are pivotally mounted, as by pins 26, to the skids. Each stanchion is provided with a plurality of spaced support members 27. As shown in FIG. 3, sloping of the tank is effected by raising the feed end to the desired elevation and securing it in the selected position by moving the proper support members 27 into underlying engagement with stub shafts 28 which extend outwardly from opposite sides of the tank. Clamping means such "J" clamps 29 may be used to secure the stub shafts in position on the stanchion supports. The selectively variable tank slope is particularly important where a wide range of organic materials are to be composted since the slope can be varied to accommodate materials having different compositions and flowability. In other words, by varying the tank slope the proper flow through rate (and detention time) may be attained despite higher or lower flowability of the treatment mass.

Proper agitation of the treatment mass is provided by a traveling mechanism mounted on the tank.

Spanning the tank lengthwise is a bridge structure 31 supporting a truck 32 which in turn carries a plurality of depending rotatable agitators 33 and their associated drive mechanism 34. The truck 32 has flanged wheels 36 which ride inside the side beams of the bridge 31; and is driven along the bridge in either direction by a suitable drive means 37 operating through a pinion gear 38 in the drive and a rack 39 on the bridge. The depending agitator shafts may be rigidly mounted to hang perpendicular to the bridge even though the tank is sloped or they may be pivotally mounted to remain vertical in all tank positions. Opposite ends of the bridge are supported by flanged wheels 41 which in turn ride on transverse rails 42 extending the width of the tank. The bridge is driven back and forth across the tank by a reversible motor 43 mounted on the side of the tank. This motor rotates a separately journalled longitudinal shaft 44 through a conventional belt and pulley arrangement 46. The longitudinal shaft 44 is in turn geared to and drives screw shafts 47 extending transversely of each end of the tank through a suitable gear box 48. Arms 49 extending downward from opposite ends of the bridge each carry a threaded bore or nut 51 which receives one of the screws 47 so that upon rotation of the screws the bridge is moved across the tank thereby moving the agitators laterally through the treatment mass.

In FIG. 7 there is shown by a simple line sketch a preferred path of the agitators through the tank contents in order to provide maximum coverage and agitating action. By means of a conventional switching arrangement the bridge is alternately driven back and forth transversely of the tank while the truck is intermittently driven from the feed to discharge end during those periods when the bridge is stopped adjacent either side wall. Better agitation is obtained when the agitators pass through the mass alternately in reverse directions rather than in the same direction. With an odd number of lateral passes this occurs automatically. Thus, beginning with the truck at point A at the feed end of the tank and following the solid line which indicates the center line of the agitators, the bridge moves across the tank while the truck remains stationary until the bridge reaches the opposite sidewall, whereupon the truck moves a short distance along the bridge. Following this the bridge again moves back across the tank.

As shown by the solid line, the first part of the cycle is continued until the entire contents of the tank are covered by the stirring action of the agitators whereupon the truck is returned to point B. If desired, the tank contents can be allowed to rest for a short time before beginning a new mixing cycle or the truck can move immediately to point C and move through the second part of the cycle as shown by the broken line until it reaches point D. As will be noted by the arrows, for any given part of the tank the second part of this cycle effects transverse movement of the agitators in a direction opposite to that of the first part of the cycle. At point D, the truck stops or may move directly to point A and the entire cycle repeated.

It is desirable that the speeds of bridge and truck are such that the agitators move through the composting material at a rate sufficient to continually maintain it in a generally loose, flowable and air-permeable state. In this connection, it has been found that speeds of two feet per minute are generally acceptable although other rates of travel may be used to suit particular conditions.

Decomposition of the organic refuse is effected by aerobic thermophilic micro-organisms of the type that cause rapid and odor-free breakdown of the refuse yielding as by-products only carbon dioxide and water vapor. The invention is based in part on the discovery that optimum conditions for maximum activity of such micro-organisms are attained and maintained by controlling conditions as to oxygen and temperature within the treatment mass in the composting zone. Illustratively, the composting action of the micro-organisms produces sufficient heat to kill all harmful organisms. However, unless controlled, the temperature of the treatment mass will exceed that at which maximum micro-organism activity occurs. Ideally, the temperature of the entire mass should be maintained in the range from 120° F. to 160° F. and in any event should be kept below 170° F. if acceptable activity is to be maintained. As noted, the temperature should be maintained in the entire treatment mass; and there should not be any localized areas in which the temperature falls outside the range. Along with the required temperature, it is also imperative that sufficient oxygen be present at all times to sustain the micro-organisms throughout the treatment mass in a healthy, active state. In accordance with the invention, the temperature and oxygen requirements are met by passing air or other oxygen-bearing gas diffusingly through the treatment mass and avoiding local effect as would occur by air injection at a plurality of points.

To this end, as shown in FIGS. 1 and 4 and in greater detail in FIG. 6, there is provided a series of plenum chambers 52 under the tank defined on the sides by cross beams 53 underlying an air diffuser which comprises a false bottom formed from a heavy wire screen 54 and a layer of wood chips 55, coarse sand or other particulate material. Communicating with each plenum chamber 52 are individual conduits 56 which in turn are coupled to headers 57 and 58 through three-way valves 59, an enlarged simplified top-sectional view of which is shown in FIG. 5. Header 57 is connected to a pressured-air supply source as at 61 while header 58 connects to a vacuum source as at 62. By this arrangement a relatively slow moving volume of air may be passed diffusingly through the treatment mass in either direction simply by changing the position of three-way valves 59. Thus, if it is desired to circulate air upwardly, the valves are all positioned to supply pressured air while, conversely, if it is desired to circulate air downwardly from above the mass the valves are positioned to communicate with the vacuum source. The movement of air downwardly through the mass is particularly preferred since it minimizes dusting in the first instance and, since the air is already confined after passage through the bed, permits scrubbing of the air to remove all dust before discharge.

It will also be appreciated that alternate plenum spaces can communicate with the vacuum source while the others are supplied with pressured air thus providing zones of reverse air flow through the treatment mass. In addition, any section of the tank may be aerated at varying rates or, if desired, to the exclusion of others.

As noted previously, thorough aeration of the composting material is important in order to achieve the maximum rate of decomposition since the micro-organisms essential for the process must be continuously supplied with needed oxygen and the diffusion of air provides a positive control over the temperature of the mass in order to hold it at a level at which the micro-organisms are most active. In this connection, a temperature sensing means 80 is mounted within the tank and coupled with the pressured air and vacuum sources through a control means 82 responsive to temperature changes in the treatment mass for controlling air circulation.

The action of the agitators maintains the treatment mass in the loose condition necessary for both proper air distribution and material flow through the tank.

In accordance with the invention, aeration may also be controlled so that less air is circulated through the treatment mass at the feed end of the tank while progressively more is circulated as the mass approaches the discharge end. This not only enables a more efficient use of the air since less is required during the initial stages of the process due to the amount already present in the raw refuse but in addition, aids in drying the finished compost.

Another feature of the invention enabling the achievement of a maximum composting rate is the recycle of finished compost to mix with raw feed. At times it is desirable to innoculate the incoming raw material with finished compost which is rich in the aerobic thermophilic micro-organisms necessary for the process. In this connection, discharge chute 63 is provided with a hinged bottom 64 which may be raised as indicated by the broken lines in FIG. 1 whenever recycling is desired. The finished compost overflowing weir 18 thus falls into a screw conveyor 66 which carries it to inclined conveyor 21 where it is combined with raw feed for return to the feed end of the tank.

When compost recycle is not desired the hinged bottom 65 is kept in the down position and finished compost falls into receiving tank 67 for storage until used. Air may be continuously passed through the compost in the storage tank 67 via piping 68 connected to a suitable air source (not shown). This is important since, as previously noted, it facilitates further drying of the compost and maintains the compost aerobic until relatively dry, thus inhibiting the activity of anaerobic micro-organisms. The anaerobic micro-organisms break down complex organic nitrogen compounds in the compost to form ammonia which is evolved resulting in loss of nitrogen. With aeration such loss of nitrogen is minimized and the product is more desirable as fertilizer.

For most organic waste materials such as domestic garbage, sewage sludge and agricultural wastes, a detention time within the tank of from five to eight days is sufficient to produce a substantially stabilized product. Detention time, which is a function of the flow rate through the tank, may be varied to suit particular materials and conditions and if a less stable product is desired detention time may be reduced to less than five days, especially if additional curing may be effected after discharge. Since the raw feed is substantially reduced in volume during composting, the feed and discharge rates are adjusted to accommodate such loss in volume and provide the detention time required to form a stabilized compost.

In FIG. 8 means are shown for increasing the discharge rate which is especially useful in those cases where the tank is maintained in a horizontal or only slightly inclined position. Dependingly mounted on the bridge 31 adjacent the tank discharge is a vertical discharge screw 69 rotatably driven by conventional drive means 71. If desired, the screw may have a tapered shaft enlarged toward the bottom and flights of the same diameter. Since the discharge screw is carried by the bridge which moves back and forth across the tank, as previously explained, the compost is regularly loosened and raised over weir 18 and, because screw 69 has a tapered shaft it fills uniformly from all depths of the tank, thus preventing longer retention periods in one section over another. Raising means (not shown) may be provided if it is desired to only use screw 69 intermittently.

In FIG. 9 there is illustrated another form of discharge mechanism which employs a vertical screw 72 dependingly mounted on bridge 31 similarly to screw 69 of FIG. 8. The screw is rotatably driven by conventional motor 73. The screw may have uniform flights and shaft. In place of a single overflow weir, discharge of finished compost is accomplished through a plurality of transverse horizontal slots 74, vertically spaced in the end wall of the tank. The rotating screw passes back and forth through the compost adjacent the end wall and by its constant agitating action breaks up any "bridging" effect of the compost over the slots thereby facilitating outflow. Because of the location of the slots 74, discharge takes place uniformly from all levels of the tank.

FIGS. 10, 12, 14, and 16 are side elevational views of four different forms of agitators especially adapted for stirring the treatment mass in the tank in accordance with the invention. FIGS. 11, 13, 15 and 17 are corresponding end elevational views taken in the direction of the arrows of FIGS. 10, 12, 14 and 16, all are intended for counterclockwise rotation.

The agitator shown in FIG. 10 is a particularly preferred form due to the minimum energy required for rotating it in the treatment mass to attain the required loosening action without vertical displacement. Blades 76 are spirally mounted in symmetrically spaced positions along shaft 77. As evident, upon rotation of the agitator little if any lifting action is exerted on the material engaged thereby. Similarly, it will be observed that the agitators shown in FIGS. 12, 14 and 16 all have open and/or discontinuous ribbon flights so as to agitate without substantial vertical displacement of any portion of the material. This is important since the excessive heat loss and high energy resuirements of lifting type screws are eliminated while at the same time maximum agitation of the treatment mass is obtained so as to maintain the bed in a loose condition thereby allowing air to circulate therethrough in either direction, the overall effect being to improve the rate of decomposition.

From the foregoing it will be seen that there is provided a method and apparatus for continuously composting organic materials to yield a sanitary, non-offensive, useful product on a continuous basis in a fast and efficient manner and in apparatus that is simply and relatively inexpensive to construct and operate. Obviously, certain features of both the method and apparatus may be employed in batch operations if the advantages of continuous operation are foregone.

I claim:

1. The continuous method of composting finely-divided organic material by the action of aerobic thermophilic micro-organisms comprising the steps of establishing and maintaining in a composting zone an everchanging treatment mass by supplying nondecomposed organic material to a feed receiving location in such zone while discharging a proportionate quantity of material from such zone at a point remote from the feed receiving location, and effecting decomposition of organic material in such treatment mass in such zone by maintaining such mass in a loosely piled condition by successively agitating laterally adjacent portions thereof at a plurality of vertically spaced elevations without substantial vertical displacement of material from any of said vertically spaced elevations while uniformly contacting the entire treatment mass with air by passing vertically therethrough a relatively slow moving stream of air of cross section substantially equal to the area of the treatment mass and in quantity at least sufficient to satisfy the oxygen requirements of aerobic thermophilic micro-organisms therein, and regulating the quantity of air passed through the mass to maintain a substantially constant temperature level in the treatment mass.

2. The method of composting organic material by digestion with aerobic thermophilic micro-organisms comprising comminuting the organic material, adjusting the moisture content of said comminuted material to a level of between 50 and 60 percent feeding said comminuted material uniformly across one end of a horizontally extending composting zone, flowing said material through such zone, maintaining in such zone a bed of material undergoing digestion, periodically agitating successive portions of said bed without substantial vertical displacement of any portion thereof to thereby maintain the entire bed in a loose and generally flowable condition, uniformly directing air through the entire cross sectional area of the bed to suppy said micro-organisms with oxygen and to maintain the temperature of said material between 120° and 160° F., holding said material in said zone to complete the digestion and conversion thereof to a substantially stabilized compost, and discharging finished compost from such zone at the opposite end from which said material is fed.

3. The method of claim 1 in which the bed of material is aerated progressively more toward the discharge end of such zone and finished compost discharged from such zone is further aerated by contact with a sufficient volume of air in a moving stream to reduce its moisture content and simultaneously to inhibit activity of anaerobic micro-organisms thereby to prevent formation and evolution of ammonia.

4. An apparatus for composting organic materials including a tank for holding a bed of said material, means for feeding raw organic material at one end of said tank and for discharging finished compost at the opposite end thereof, means supported above said tank and extending thereunto for agitating laterally successive portions of said bed of material at a plurality of vertically spaced locations without substantial vertical displacement of material engaged thereby, means to sense the temperature in said bed, aerating means including a gas-permeable solids supporting means spaced from the tank bottom and co-extensive in area therewith for effecting uniform air circulation vertically through said bed, and control means connected to said means to sense the temperature to regulate the air circulated through said bed as a function of the temperature sensed therein.

5. The apparatus of claim 4 in which there is provided means for variably inclining the bottom of the tank between feed and discharge ends.

6. The apparatus of claim 4 in which said means for agitating said bed comprises at least one rotatable shaft extending vertically through said bed, blade means on said shaft adapted to agitate localized portions of the bed without substantial vertical displacement of material engaged thereby.

7. The apparatus of claim 4 in which said blade means comprise a plurality of blades mounted in spirally spaced symmetrical relationship on said shaft.

8. The apparatus of claim 4 in which said blade means comprise a screw flight open at the center and mounted concentrically about and coaxially with said shaft.

9. Apparatus for composting organic materials including a tank for holding a bed of said material, means for feeding raw organic material at one end of said tank and for discharging finished compost at the opposite end thereof, means extending thereunto for agitating laterally successive portions of material without substantial vertical displacement thereof, means disposed in said tank for sensing the temperature in said bed, aerating means associated with said tank for selectively diffusing oxygen-bearing gas upwardly and downwardly through the entire cross section of said bed, and control means connected to said means for sensing the temperature and said aerating means for varying the quantity of gas diffused through said bed in accordance with the temperature sensed therein.

10. The apparatus of claim 9 in which said aerating means comprises gas permeable solids supporting means spaced from the tank bottom and co-extensive in area therewith, laterally adjacent plenum chambers defined between said gas-permeable solids supporting means and said bottom by a plurality of gas impermeable barriers, and gas conducting conduits communicating with each of said plenum chambers, each of said conduits selectively communicating with a vacuum source and pressured air source.

References Cited

UNITED STATES PATENTS 2,954,285   9/1960   Carlsson et al. _____ 23—259.1
3,114,622  12/1963  Hardy _____ 23—259.1

DONALL H. SYLVESTER, *Primary Examiner.*

R. BAJEFSKY, *Assistant Examiner.*